United States Patent [19]

Desanti

[11] 4,075,659
[45] Feb. 21, 1978

[54] ELECTRONIC DOOR ANNOUNCER

[76] Inventor: Etiennette Romani Desanti, "Le Clos des Oliviers" 80, avenue de Lattre de Tassigny, 06400 Cannes, France

[21] Appl. No.: 616,643

[22] Filed: Sept. 25, 1975

Related U.S. Application Data

[63] Continuation of Ser. No. 387,657, Aug. 13, 1973, abandoned.

[30] Foreign Application Priority Data

Sept. 8, 1972 France .................................. 72.31853

[51] Int. Cl.² .............................................. H04N 7/18
[52] U.S. Cl. .................................... 358/108; 358/143;
 179/2 TV
[58] Field of Search .................. 178/5.6, DIG. 13;
 179/37, 2 TV; 325/308; 340/286; 358/108, 141,
 143

[56] References Cited

U.S. PATENT DOCUMENTS

| | | | |
|---|---|---|---|
| 3,105,873 | 10/1963 | Winston et al. | 178/DIG. 13 |
| 3,517,120 | 6/1970 | Bunting | 178/DIG. 13 |
| 3,728,493 | 4/1973 | Ter Veen | 179/37 |
| 3,796,829 | 3/1974 | Gray | 325/308 |
| 3,806,638 | 4/1974 | Camras | 178/5.6 |
| 3,816,662 | 6/1974 | Shaver et al. | 179/2 TV |
| 3,860,746 | 1/1975 | Takeuchi | 178/DIG. 13 |

Primary Examiner—Richard Murray
Attorney, Agent, or Firm—George H. Mitchell, Jr.

[57] ABSTRACT

Electronic door announcer for apartments of a multi-family dwelling having a community television antenna in which the signals due to sound and video operation of the announcer are carried by at least part of the community antenna coaxial cable system, switching means for the individual apartments being connected into said coaxial cable system.

15 Claims, 10 Drawing Figures

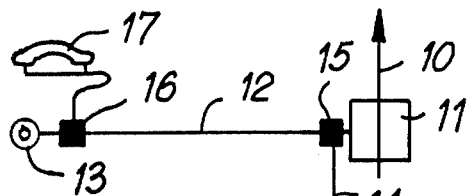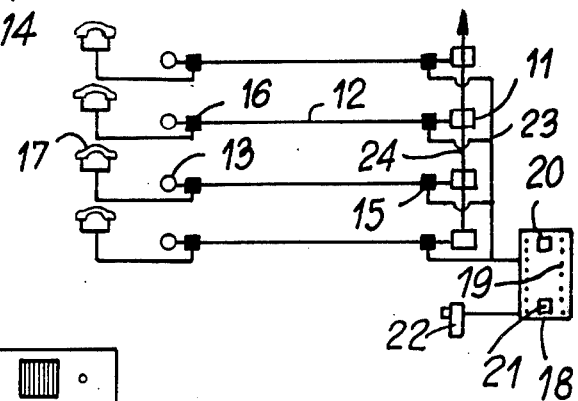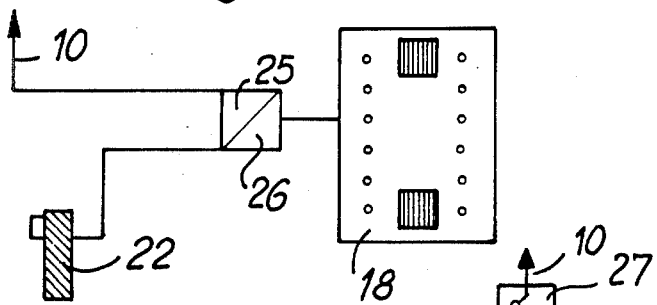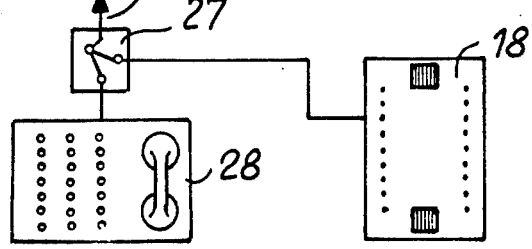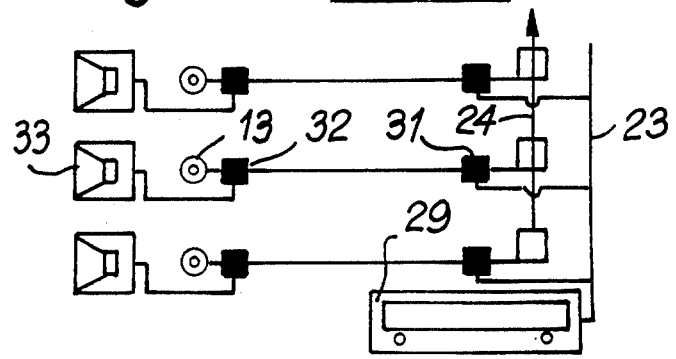

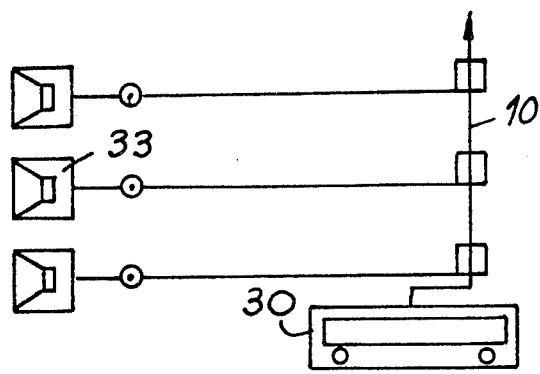
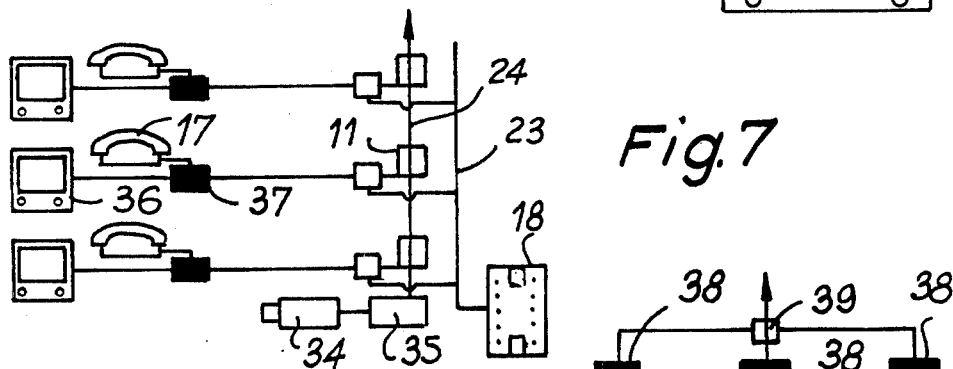
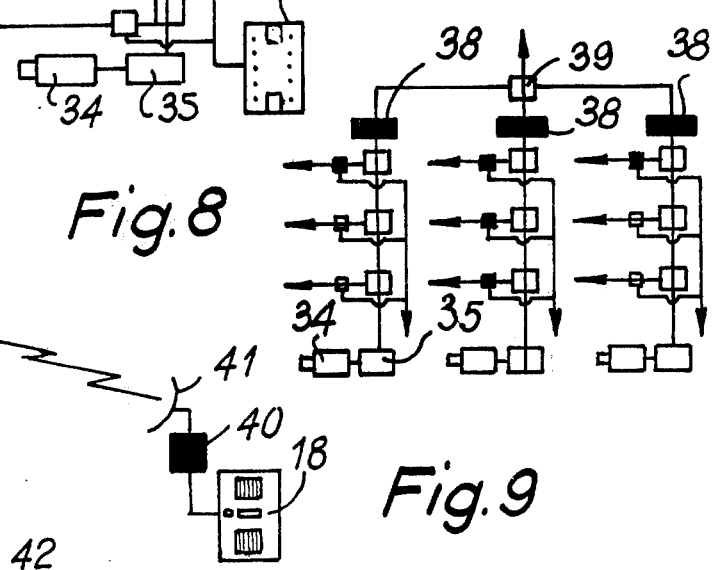
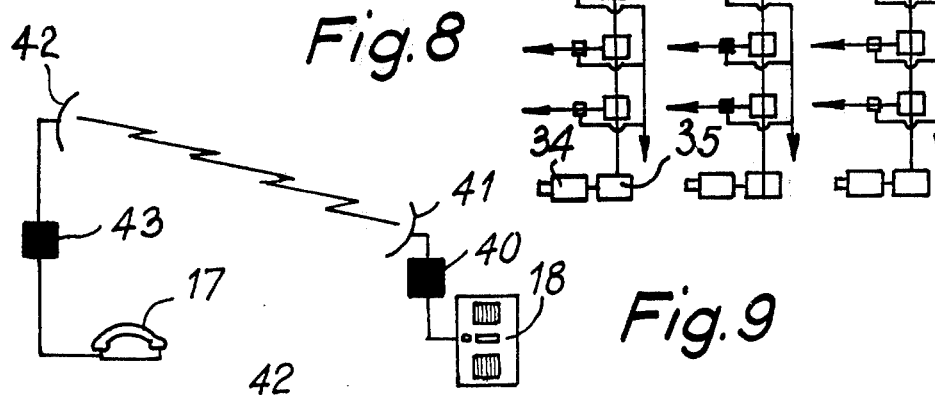
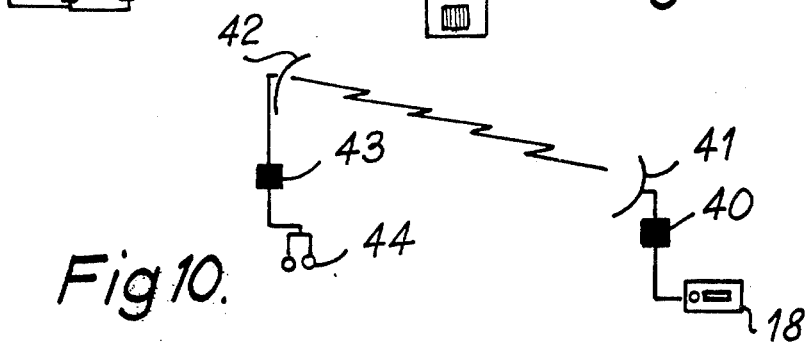

ELECTRONIC DOOR ANNOUNCER

This application is a continuation of application Ser. No. 387,657, filed Aug. 13, 1973, now abandoned.

BACKGROUND TO THE DISCLOSURE

In apartment buildings of modern design, when a visitor wishes to be admitted by the occupant of an apartment in such a building, he must stand in front of the closed door of the main entrance and alert the occupant by pressing the appropriate button on the external panel of a device known as an electronic front door announcer; the occupant, thus alerted, may then, from his apartment, by audio or visual means forming part of the aforesaid front door announcer, check the identity of the visitor and, if he decides to admit this visitor, release the automatic opening device of the door of the main entrance by remote control.

The circuits of known electronic front door announcers require a relatively high number of conductors for the common vertical connections and the individual floor connections; this number obviously depends upon the basic design of the announcer and the various functions which it has to perform. Consequently, fitting such an announcer is complex and costly because of the laying of connection sleeves between floors, between the conduit and the various apartments and above all the laying of the various cables and their connections.

OBJECT OF THE INVENTION

The present invention proposes to simplify the installation of such announcers while enabling the functions performed by such a device to be increased at no great cost; the concept of this invention lies in the fact that almost all relevant apartment buildings include one or more community antenna, the coaxial cables of which can be used to perform other functions than that of individual TV distribution; this has not previously been considered.

BRIEF SUMMARY OF THE INVENTION

The present invention relates to an electronic front door announcer for apartment buildings with at least one community television antenna, characterized by the fact that the network of cables carrying the signals and voltages required for the operation of the announcer is formed, at least in part, by the system of coaxial cables of the community antenna, the switching operations required at front door level, on the various floors and in the apartments being handled by diodes or similar devices on the corresponding coaxial connection cable.

The community television antenna coaxial cable system can be used in part or in toto; it is used in part when, at each floor level, the announcer cable ends for each apartment at the signal coupler for the signals and voltages on the coaxial cable supplying this apartment coming from the floor's television junction box; it is used in toto, when the announcer cable is omitted and replaced by the vertical coaxial cable of the television antenna.

Of course, if, exceptionally, an apartment building is built without a community television antenna, the invention can still be applied by equipping the apartment building with a system of coaxial cables supplying at the same time a community television antenna and an electronic front door announcer.

BRIEF DESCRIPTION OF DRAWINGS

The invention will be clearly understood in detail and in its various possible applications using the description which follows with reference to the attached drawings giving the circuit diagrams of several practical applications of this improved electronic front door announcer.

In the drawings:

FIGS. 1 and 2 are circuit diagrams with partial use of the community television aerial coaxial cable system to serve the apartments in an apartment building.

FIG. 3 is a circuit diagram with total use of the community antenna coaxial cable system to serve the apartments on the different floors of an apartment building, with selective call, door latch electrically operated by high frequency modulator, and release relay.

FIG. 4 is a view of an installation complementary to the circuits in FIGS. 2 and 3 to provide the operation of a telephone switchboard during the day and the electric latch of the front door announcer at night.

FIG. 5 is a view of other circuits complementary to FIG. 2 to enable 'piped' music to be distributed from a low frequency source.

FIG. 6 is a high frequency alternative to FIG. 5.

FIG. 7 is the diagram of the adaptations of circuits such as that of FIG. 2 of televised transmission of pictures provided by a "watchdog" camera with a high frequency modulator.

FIG. 8 is the same as FIG. 7 for a large apartment building with several entrances.

FIG. 9 is the basic diagram of the adaptation of the invention to any building separated from the street announcer unit by a courtyard, garden or other obstacle, the connection of the street announcer unit to the announcer circuits in the apartment building being provided by a directional beam radio link system.

FIG. 10 is a simplification of the installation in FIG. 9 when the interphone system is omitted and replaced by transmission of a sound signal.

DESCRIPTION OF EMBODIMENTS

As shown in the diagram in FIG. 1, a trunk line coaxial cable running vertically through the apartment building and ending at the community antenna is represented by 10; on each floor, it passes through a junction box 11, out of which come one or more branch line coaxial cables, e.g., 12, distributing television to the apartments.

In the invention, on each cable 12, preferably close to the floor's junction box or inside it, is fitted a signal coupler 15 into which runs the relevant conductor of the announcer cable 14 coming from the street announcer unit which is not shown. The cable 12 carries the television signals and the signals from the street announcer unit when it is operated by a visitor; at the entrance to the apartment, a second signal coupler 16 which separates these signals, the television signals being sent to the point 13 into which a set is plugged, while the signals from the announcer go to the sound receiver 17 of the apartment concerned. This may be a double outlet point and include the separating system.

Since each signal coupler 15 and 16 must provide two-way signal flow of various signals and voltages (e.g., the current actuating the electric latch), and inject or extract these values in the cables without breaking the impedance or causing interference, it will have coupling capacitors and filters or semiconductors with or without amplification, or another system with the same function. Two way signal couplers of this type are disclosed for example, in U.S. Pat. No. 3,105,873 granted Oct. 1, 1963.

As may be seen, this version of the invention in the general diagram in FIGS. 1 and 2 brings into play a common cable, the cable coming from the street announcer and the various coaxial cables distributing television from the floor junction boxes into the different apartments; therefore it is indeed a partial utilization of the apartment building's coaxial television cable system.

In another version in accordance with the general layout in FIG. 3, the use of this system becomes total, the announcer cable being omitted and replaced by the coaxial cable running vertically through the apartment building which ends at the community television antenna.

In this diagram, the same items as those in FIGS. 1 and 2 are represented by the same reference numbers; in addition the street announcer unit, directly accessible to visitors, is shown at 18. Such a two wire intercom system is taught, for example, In French Pat. No. 2,113,710 published June 23, 1972. This is an electric box unit with as many signal push buttons 19 as there are apartments in the apartment building; 20 is the microphone grille, 21 is the listening grille and 22 is the electric latch which opens the door.

In FIG. 3 the announcer cable having become a coaxial cable handling all the functions, the announcer system is entirely electronic with selective call; actuating one of the push buttons on the street announcer unit allows, with the set of frequencies utilized, any individual apartment to be called; all the alternating and direct currents flow in the coaxial cable (or cables, according to the size of the apartment building) of the television antenna; selective extraction for sound reception to the apartments is carried out in a way similar to that of FIG. 1, but there must also be, at the level of the street announcer unit, extraction of the signal controlling the operation of the electric latch by direct transmission.

Still looking at FIG. 3, if it is preferred to operate the sound transmission in the installation through a high frequency modulator 25, operation of the electric latch will be done on a particular frequency by the occupant of the apartment, and sent via the coaxial cable 10 of the community antenna to the relay 26 releasing the electric latch 22 at the level of the street announcer unit.

If the building is intended for institutional use (hotel, offices, clinic, etc.), it is worth noting that the installation according to the invention can be combined with a small telephone switchboard allowing connection with the person requested and also connection between any two points of the installation.

In a luxury apartment building, the same embodiment can be used with a switch 27 enabling the street announcer unit with the electric latch to operate at night, and daytime communications through a switchboard 28 in the caretaker's office (see FIG. 4).

An installation according to the invention is also suitable for the distribution of 'piped' music whether or not in combination with an interphone system; this distribution can be achieved by using a low frequency source 29 (FIG. 5) or a high frequency signal coming from any modulator 30 (FIG. 6). In the first case and as shown in FIG. 5 each apartment must be provided with a complementary signal coupler unit (31 and 32), the loud speaker with its attached circuits being housed in a case 33.

Another interesting variant of the invention lies in televised monitoring of visitors; in this case more complex arrangements of equipment are required, because it should be possible to separate at will television on the official stations from the 'watchdog' television; on the other hand, the wiring modifications are negligible, since it is still the community antenna coaxial cable system which provides all the transmissions. All that is necessary is to unite a coaxial function between the camera taking the 'watchdog' pictures and the coaxial cable of the community antenna; but in each apartment, the pictures from the announcer can be received on a standard television set which also receives the television stations, at the same time ensuring absolute secrecy of the pictures from the announcer for one apartment with respect to the others.

The wiring diagram is given in FIG. 7 in which 34 is the 'watchdog' camera of a standard type according to what is desired; the output of this camera passes through a high frequency modulator 35; according to choice this modulator provides a high frequency signal located in one of the frequency bands reserved for the television stations and on any channel, or outside these bands which assists the maintenance of secrecy of the 'watchdog' picture; this signal is put into the coaxial cable of the television antenna. There is at least one television set 36 in each apartment and above it on the circuit a switching unit 37 the structure and function of which will be explained further on. However, an illustrative example of such a switching unit is included in the teaching of U.S Pat. No. 3,534,161 granted Oct. 13, 1970.

When we are dealing with an apartment building with several entrances with a camera at each entrance, there can be a different community antenna coaxial cable system for each entrance, and in this case installations identical to those in FIG. 7 are used. On the other hand, if the different sections of the apartment building are fitted in parallel on a single community antenna, the installation in FIG. 8 is used; it differs from that in FIG. 7 in that each section is isolated from the others, on the frequency band used for transmission of the pictures from the announcer, by a very high rejection band filter 38 inserted before the community antenna on the coaxial cable of the section; 39 is the section distribution box.

But whether the installation is that of FIG. 7 or of FIG. 8, for each apartment it is the switching unit 37 which operates the sound and television announcer in the desired manner.

The unit 37 is rather complex, but all its components are known and on the market. Further illustrative examples of such apparatus are included in U.S. Pat. No. 3,816,662 granted June 11, 1974 and U.S. Pat. No. 3,860,746 granted June 14, 1975. It is plugged into the inlets of the community antenna, front door announcer and the mains, and contains the necessary automatic switching elements:

switching on of the television set, with adjustable time delay.

switching on of the small conversion unit (allowing through the television or front door announcer pictures).

It also includes antenna outlet, a supply outlet for the television set, a manual on-off switch for the reception of programs on the television stations, and an outlet to the sound receiver.

With the aid of this unit, when a visitor presses the pushbutton on the street announcer unit corresponding to the apartment concerned, he produces a sound signal on the sound receiver and turns on the television set which, in a few seconds, shows the picture coming from the 'watchdog' camera.

If the television set is already being used on a televised program of any station, when the sound signal is received, the occupant of the apartment thus alerted must intervene by pressing a pre-adjusted button on the high frequency demodulator, to produce on the screen the picture of the visitor instead of the program being received; the occupant may then if he wishes, speak with the visitor using the telephone receiver.

But the switching unit 37 can be made still more automatic, i.e., after pressing the pushbutton, the relay in the switching unit causes, in addition to the foregoing functions, short circuiting of the television antenna inlet; in addition, the conversion unit, which is brought into operation, is in this case followed by several stages: If amplification, video pre-amplification detection with adjustment of the output level, which enables it to feed the video input of the television through a circuit cable. See, for example, the aforementioned U.S. Pat. No. 3,860,746.

The occupant of the apartment then, without being in any way involved, sees the picture of the program in progress disappear and for a limited period which is adjustable on the switching unit, the picture of the visitor appear.

The invention can be usefully completed by a general alarm circuit in case of any disaster, and this circuit can be applied to the various alternative installations described above: the person responsible for the apartment building has in his premises or elsewhere a safety key contact which can simultaneously operate all the sound systems and where relevant all the television sets; the person responsible can thus alert all the occupants of the apartment building with the minimum of delay.

Up to here it has been supposed that each apartment is fitted with a single sound receiver and a single television inlet point; it is thought that the invention is still applicable with modifications which are simple and obvious for the specialist, if several receivers and points exist; but reception of the station programs and audio and visual calls from the electronic front door announcer can be distributed at will among the various receivers and points.

It has been supposed in addition that the switching and interphone elements of an apartment are outside the television set; it goes without saying that the television set can itself be fitted with these items, which does not in any way prevent it from operating as a normal receiver on an ordinary television point. Such a television set can maintain the secrecy of the pictures from the electronic front door announcer by different, simpler means then those described above, such as:
- direct transmission on a normal television channel, but with reversal of picture polarity direction and restitution in the television set.
- direct transmission on a normal television channel, with picture scanning on a different number of lines from the station standards and automatic synchronization system on the television set when it is called.

Finally, the televised front door announcer can be two-way, i.e., any visitor may see the picture of the person requested which requires an extra camera with high frequency modulator in the apartment, and picture receiver to be seen by the visitor.

Still to be examined are the means of adapting the invention to the various cases where the apartment building, chateau, villa, production or research center, etc. is separated from the surrounding fence by other buildings, grounds, gardens, trees, etc.

Basically these means are simple and consist in forming cable links, whether buried or not, between the installation inside the apartment building and the sound and visual detector or detectors guarding the entrance gate or gates of the surrounding fence. However difficulties can occur in laying the connections between the apartment building to be served and an entrance gate, due to the nature of the ground and intervening obstacles; the invention therefore provides for the completion of the installation with a directional beam radio link system, and FIGS. 9 and 10 show two diagrams embodying this system.

In FIG. 9, the street announciator unit 18 and its attached parts are supplied by a long life battery; these parts and this battery can be housed in the same box 40; at the outlet of the unit, a connection cable feeds a small parabolic antenna 41; this is directed towards the apartment building at an exact point where there is a wave collector 42 which is identical and directed along the same axis; this collector feeds its own circuits shown in schematic form at 43 which are connected to any of the standard installations described above, of which only the telephone receiver 17 has been shown.

FIG. 10 is the diagram of a simplified installation which provides only a sound signal by ringing 44.

The final possibility to the various installations according to the invention at no great installation cost is the recording of sound and/or picture, should the person required by visitors be absent; for sound, an extra change-over box is plugged into the inlet point between it and the telephone receiver in such a way as to switch on a tape recorder or a telephone answering machine giving a recorded message to the visitor, upon the call signal; in the case of the televised front door announcer, the relay box will switch on not only the television set, but also a video tape recorder which will record the pictures.

I claim:

1. In an electronic door announcer system for multiple unit buildings including a main door announcer unit and at least one individual building unit announcer unit and a master antenna system having a coaxial cable network comprised of at least one coaxial trunk line and at least one coaxial branch line coupled to said trunk line for utilizing said coaxial cable network as the signal transmission means for said door announcer system, said branch line being fed to a building unit including said at least one announcer unit, the improvement comprising:
   circuit means including a high frequency modulator, adapted to modulate signals originating in said main door announcer unit, coupled to said trunk line in the region of said door announcer unit for transmitting modulated signals to said building unit via said branch line;
   first and second bidirectional signal coupler means for audio frequency signals originating at said main door announcer unit and said building unit announcer unit, respectively, coupled to said branch line, said first coupler unit being located at the trunk line end of the branch line and said second coupler means being located at the building unit end of the branch line;

audio signal transmission line means between said first coupler means and said main door announcer unit;

circuit means coupling audio signals between said second coupler means and said building unit announcer unit; and circuit means, responsive to said modulated signals from said modulator, coupled between said branch line and said building unit announcer unit for providing signals, utilizable by said building unit announcer unit, corresponding to signals originating at said main door announcer unit.

2. The system as defined by claim 1 and additionally including a main door lock and relay means adapted to release said main door lock and wherein said building unit announcer unit includes means for generating a control signal coupled to said branch line for selectively operating said relay.

3. The system as defined by claim 2 wherein said means for generating said control signal for operating said relay includes a high frequency signal source and additionally including means coupled to said relay which is responsive to high frequency signals coupled thereto from said high frequency source to operate said relay.

4. The system as defined by claim 1 wherein said main door announcer unit additionally includes television camera means coupled to said modulator means for coupling video signals thereto and wherein said building unit announcer unit includes television receiver means coupled to said circuit means responsive to said modulated signals from said modulator for receiving signals from television camera means.

5. The system as defined by claim 4 wherein said main door announcer unit includes selectively actuated audio signal generator means for transmitting an annunciator signal to said branch line.

6. The system as defined by claim 5 wherein said audio signal generator is coupled to said first coupler means.

7. The system as defined by claim 6 and additionally including circuit means coupled to said branch line at said individual building unit and being operable in response to said annunciator signal to turn on said television receiver.

8. The system as defined by claim 1 wherein said circuit means responsive to said modulated signals includes a high frequency signal demodulator for demodulating high frequency signals received from said main door announcer unit.

9. The system as defined by claim 8 wherein said main door announcer unit additionally includes a television camera coupled to said modulator unit and wherein said building unit announcer unit includes television receiver means coupled to said demodulator.

10. The system as defined by claim 9 wherein said main door announcer unit includes pushbutton operated audio signal generator means selectively coupled to said branch line and additionally including circuit means responsive to a signal received from said audio signal generator means for turning on said television receiver and for rendering said demodulator unit operable.

11. The system as defined by claim 1 and additionally comprising circuit means including a high frequency modulator, coupled to and adapted to modulate signals originating in said building unit announcer unit, coupled to said branch line for transmitting modulated signals to said main door unit, and circuit means at said main door announcer unit, responsive to modulated signals from said last recited high frequency modulator for providing signals utilizable by said main door announcer unit, corresponding to signals originating at said building unit announcer unit.

12. The system as defined by claim 11 wherein both said means responsive to said modulated signals are comprised of high frequency demodulators.

13. The system as defined by claim 12 and additionally including a main door lock and relay means operable to release said main door lock and wherein said building unit announcer unit includes means for selectively providing a control coupled to the high frequency modulator coupled to said building unit announcer unit and wherein said relay means is coupled to the high frequency demodulator at said main door announcer unit.

14. The system as defined by claim 1 wherein said coaxial cable network is comprised of a plurality of coaxial trunk lines respectively isolated from each other and wherein each of said trunk lines has a plurality of branch lines respectively coupled thereto, each said branch lines including respective first and second bidirectional couplers coupled thereto with said first bidirectional coupler means connected back to said main door announcer unit and a respective high frequency modulator coupled to each said trunk line and respective television camera means coupled to each high frequency modulator and wherein each of said plurality of branch lines coupled to respective building unit announcer units including a television receiver selectively responsive to said TV camera coupled to the trunk line to which the branch line is connected.

15. The system as defined by claim 1 wherein said main door announcer unit is remotely located from said trunk line and coupled thereto by means of a radio link coupled to said coaxial cable network.

* * * * *